United States Patent [19]

Schoening et al.

[11] Patent Number: 4,789,519
[45] Date of Patent: Dec. 6, 1988

[54] NUCLEAR REACTOR PLANT

[75] Inventors: Josef Schoening, Hambruecken; Hubert Handel, Rimbach, both of Fed. Rep. of Germany

[73] Assignee: Hochtemperatur-Reaktorbau GmbH, Fed. Rep. of Germany

[21] Appl. No.: 914,536

[22] Filed: Oct. 1, 1986

Related U.S. Application Data

[63] Continuation of Ser. No. 655,650, Sep. 28, 1984, abandoned.

[30] Foreign Application Priority Data

Sep. 30, 1983 [DE] Fed. Rep. of Germany ....... 3335451

[51] Int. Cl.⁴ .............................................. G21O 1/00
[52] U.S. Cl. .................... 376/381; 376/219; 376/337; 376/338; 221/299
[58] Field of Search ................ 221/258, 299; 376/219, 376/273, 299, 338, 226, 381, 382, 383, 406, 461, 265, 266, 337, 287, 293, 295, 298, 458

[56] References Cited

U.S. PATENT DOCUMENTS

| | | | |
|---|---|---|---|
| 2,910,416 | 10/1959 | Daniels | 376/265 |
| 3,105,033 | 9/1963 | Camac | 376/337 |
| 3,120,471 | 2/1964 | Koutz et al. | 376/295 |
| 3,142,625 | 7/1964 | Wellborn . | |
| 3,192,123 | 6/1965 | Costes et al. | 376/337 |
| 3,325,373 | 6/1967 | Schlicht et al. | 376/381 |
| 3,347,747 | 10/1967 | West et al. | 376/338 |
| 3,406,092 | 10/1968 | Margen | 376/338 |
| 3,410,452 | 11/1968 | Igel et al. | 221/299 |
| 3,427,220 | 2/1969 | Rennie et al. | 376/265 |
| 3,464,888 | 9/1969 | Boettcher | 376/266 |
| 3,755,079 | 8/1973 | Weinstein et al. | 376/273 |
| 3,947,322 | 3/1976 | Dorner et al. | 376/461 |
| 4,061,534 | 12/1977 | Jackson | 376/298 |
| 4,664,871 | 5/1987 | Schoening | 376/381 |

FOREIGN PATENT DOCUMENTS

| | | | |
|---|---|---|---|
| 597598 | 5/1960 | Canada | 376/381 |
| 57868 | 8/1982 | European Pat. Off. | 376/338 |
| 1514442 | 6/1970 | Fed. Rep. of Germany | 376/338 |
| 2325828 | 12/1974 | Fed. Rep. of Germany | 376/338 |
| 3212266 | 4/1982 | Fed. Rep. of Germany . | |
| 3048616 | 7/1982 | Fed. Rep. of Germany | 376/381 |
| 3149794 | 6/1983 | Fed. Rep. of Germany | 376/381 |
| 3242760 | 5/1984 | Fed. Rep. of Germany | 376/381 |
| 19091 | 2/1979 | Japan | 376/338 |
| 998933 | 7/1965 | United Kingdom . | |
| 1084999 | 9/1967 | United Kingdom . | |
| 1098299 | 1/1968 | United Kingdom | 376/338 |
| 1208877 | 10/1970 | United Kingdom | 376/265 |

Primary Examiner—Charles T. Jordan
Assistant Examiner—Richard L. Klein
Attorney, Agent, or Firm—Robert J. Koch

[57] ABSTRACT

In a nuclear reactor installation with a small high temperature reactor (26) all of the components of the primary loop, together with the control and shutdown installations (82, 92, 114, 116; 194, 198, 200) are located inside a steel pressure vessel (16) and may be installed and dismantled from above. This makes an economical subterranean construction possible.

23 Claims, 5 Drawing Sheets

NUCLEAR REACTOR PLANT

This application is a continuation of application Ser. No. 655,650 filed Sept. 28, 1984.

FIELD OF THE INVENTION

The invention concerns a nuclear reactor installation with a small high temperature reactor and a plurality of heat exchangers, in particular steam generators, arranged over the small reactor and housed together with the reactor within the inner space of a multiple part, standing cylindrical pressure vessel, with cooling gas heated in the small reactor flowing with the aid of cooling gas blowers from top to bottom through the heat exchangers, with a control and shutdown installation for the insertion and/or extraction of first absorber elements in absorber channels extending downward from above and with a second shutdown installation for the insertion of second absorber elements and finally with at least one discharge tube for the removal of the spherical fuel elements from the small reactor.

BACKGROUND OF THE ART

In a power plant of this type, for example, as disclosed in West German Pat. No. 32 12 266, the cooling gas blowers are arranged outside on the shell of the pressure vessel and extend, in relation to the diameter of the pressure vessel, in the radial direction far to the outside. Similarly, the control and shutdown installation and the second shutdown installation, including absorber elements in the form of absorber rods for insertion from the bottom into the small reactors, are protruding far from the bottom of the pressure vessel. The same is true for the discharge tube, whereby the spherical fuel elements may be taken from the small reactor. Even though the rest of the structural elements or components, such as for example the core, the cooling gas conduits, support elements, heat shields, reflectors, steam generators and the accessories of the said components are arranged within the pressure vessel and may therefore be installed, removed or replaced from above, this known embodiment is hardly appropriate for the construction of a subterranean nuclear reactor installation. The aforementioned components, which are protruding laterally and at the bottom from the pressure vessel and are in part accessible from below only and require a suitably large installation space, so that the economy of a subterranean construction of a nuclear reactor plant becomes questionable.

SUMMARY OF THE INVENTION

It is therefore the object of the invention to provide a nuclear reactor power plant or installation of the above-mentioned type, comprising structural parts or components protruding only slightly or not at all past the periphery of the pressure vessel, and wherein the pressure vessel and its components may be installed and dismantled completely or at least in part from above. The installation is to be entirely capable further of sustaining operating loads.

According to the invention, this object is attained in the case of a nuclear installation of the abovedescribed type by arranging the cooling blowers entirely within the inner space and above the heat exchangers. The discharge tube is conducted laterally from the pressure vessel, the control and shutdown installation is placed inside the pressure vessel and is equipped with piping connecting in each case the upper and lower terminal area of an absorber channel and wherein the first absorber elements in the form of first absorber balls are contained and from where they may be inserted on top and removed at the bottom of the absorber channels in a controlled manner. The second shutdown installation is again arranged in the internal space and comprises at least one ball container provided above the absorber channels, wherein the second absorber elements in the form of second absorber balls are stored and from where they may be inserted in the absorber channels again in a controlled manner.

All of the components are then arranged within the pressure vessel, so that space requirements in the radial direction and in depth are low, thereby rendering a subterranean installation economically feasible. Furthermore, the configuration according to the invention permits the installation and dismantling of the pressure vessel together with its components, and the replacement of said components from above, thereby further improving the economy of an underground plant. The layout and configuration of the cooling blowers, the control and shutdown installation and the second shutdown assembly within the pressure vessel leads to an extensive utilization of the internal space and consequently a compact structure of the components, while assuring their safe operation.

BRIEF DESCRIPTION OF THE DRAWINGS

Advantageous and preferred further developments of the invention will become apparent from the dependent claims and the description hereinafter of embodiments with reference to the schematic drawings.

In the Drawings.

DETAILED DESCRIPTION OF THE EMBODIMENTS

Similar parts are identified by identical symbols in the individual figures. Furthermore, individual parts reoccurring in various figures are identified by symbols only to the extent necessary for comprehension.

Figure 1:
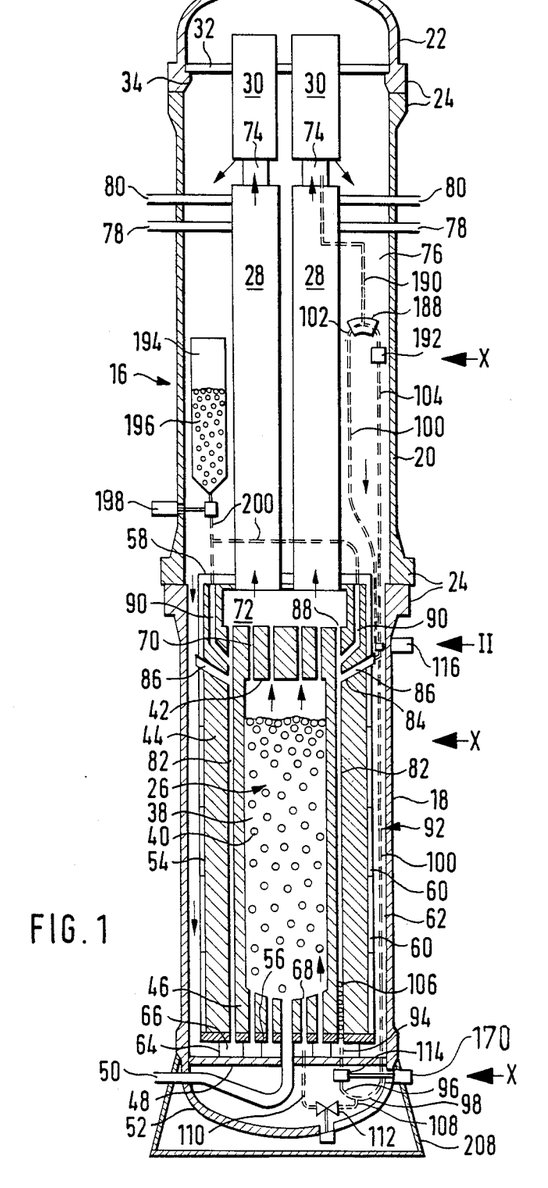
FIG. 1 shows an axial, vertical longitudinal section through the nuclear reactor installation and the pressure vessel.

According to FIG. 1, the steel pressure vessel 16 comprises a lower cylindrical part 18, an upper cylindrical part 20 and a vaulted roof part 22. All of the parts of the vessel are joined to each other by flanges 24, with the joints sealed and monitored for leakage. The upper roof part 22 and the lower closure of the bottom part 18 have the configuration of basket arch bottoms, with the top part 22 being short in comparison with the other parts of the pressure vessel 16. For its erection, the pressure vessel is provided with feet 208.

The lower part 18 of the pressure vessel serves to receive a small high temperature reactor 26, while in the upper part 20 two steam generators 28 are located as the heat exchangers, together with the same number of cooling gas blowers 30.

The cooling gas blowers are supported by means of an intermediate bottom 32 on an inner projection 34 of the top part extending peripherally in the area of the flanges 24.

The small high temperature reactor 26 has a core 38, comprising of a pile 40 of spherical fuel elements in the form of pebbles. The pile is surrounded on all sides by a graphite reflector, comprising a roof reflector 42, a side reflector 44 and a bottom reflector 46. The graphite reflector 42, 44, 46 is supported on a bottom plate 48 which is part of a support structure and is penetrated by the discharge tube 50. The discharge tube 50 extends in the area of the bottom reflector 46 and the bottom plate 48 vertically and in the center of said parts and is bent laterally under the bottom plate so that the discharge tube 50 is conducted laterally from the pressure vessel 16 in the area of the lower basket arch 52.

A thermal shield is arranged around the graphite reflector 42, 44, 46, the side part 54 whereof is extending spaced apart from the side reflector 44, supporting the latter by means of radial, rod like supports 60. Between the side part 54 of the thermal shield and the wall of the lower part 18 of the pressure vessel an annular gap 60 is provided. The thermal shield is made of steel.

The plate shaped bottom part 56 of the thermal shield upon which the reflector 42, 44, 46 is resting, is supported on bending supports 64 placed on the bottom plate 48. Between the bottom part 56 and the bottom plate 48, a cold gas collector space 66 is arranged, said space 66 being connected by means of a plurality of bores and channels 68 of the bottom part 56 and the bottom reflector 46 with the pile 40 of the fuel elements. In the roof relfector 42, closing off the core 38 on top, again a large number of vertically extending bores or channels 70 is provided, said bores 70 connecting the core 38 with a hot gas collector space 72, which is cylindrical in configuration and is recessed at the upper end of the roof reflector 42. Helium is used as the cooling gas; it is conducted from above through the reactor core 38.

The heat exchangers or steam generators 28 are connected with the hot gas collector space 72. The generators 28 consist of vertical cylinders, the lower hot gas connections of which lead through the horizontally extending roof part 58 of the thermal shield into the hot gas collector space 72. The steam generators 28 extend in the vertical direction nearly over the entire height of the upper part 20 of the pressure vessel and their gas outlets are connected by means of connector fittings 74 with the suction side of the cooling gas blowers 30. The cooling gas blowers are also in the form of vertical cylinders and the cooling gas exits at their lower end into the inner space 76 of the pressure vessel. Here, the cooling gas is conducted downwards, and enters the annular gap 62, leading it into the cold gas collector space 66.

From here, the cooling gas enters the core 38 through the bores 68, flows upward after heating and is conducted subsequently through the vertical bores or channels 70 of the roof reflector into the hot gas collector space 72, whereby the loop is closed. The annular gap is formed between the pressure vessel 16 and the lateral part 54.

The feed water for the steam generators 28 is supplied through the lines 78, while the steam may be taken through the lines 80. The lines 78, 80 are arranged on the upper terminal area of the steam generator 28 and are conducted radially through the pressure vessel to the outside.

In the side reflector 44 a plurality of essentially vertical absorber channels 82 is arranged. Each of these absorber channels departs from the cold gas collector space 66, penetrates the bottom part 56 of the thermal shield and leads vertically upwards to a branching location 84, arranged in the area of the roof reflector 42. From the branching location 84 a partial piece 86 of the absorber channel leads to the outside into the annular gap 62, ascending in the radial direction. A channel piece 88 is further connected with the branching location 84, said piece 88 opening into the hot gas collector space 72 and representing a vertical extension of the absorber channel 82, while having a smaller cross section than the absorber channel 82. This cross section is at least large enough to allow the passage of the second absorber balls.

A second channel piece 90 is connected with the piece 88, said piece 90 being conducted through the annular area of the roof reflector surrounding the hot gas collector space 72, vertically in the upward direction. The cross section of the second channel piece 90 is less than the cross section of the absorber channel 82, 86; it is preferably equal to the cross section of the channel piece 88.

A control and shutdown installation and a second shutdown installation are provided for the shutdown and control of the small high temperature reactor, with the absorber channels constituting parts of each of these installations.

The control and shutdown installation further comprises lines 92, each of which connects the lower end of an absorber channel 82 with its upper end. Even though in the figures only one tube 92 is shown with its accessories, all of the absorber channels is equipped with one tube 92, described in detail here. Each tube 92, has a first partial segment 94 leading downward from the lower connection to the absorber channel 82 and connected by a tube bend 96 with a second partial segment 98, which leads radially outward and descending into the area of the annular gap 62. A third partial segment 100 connects with the second partial segment and leads vertically upwards into the area of the steam generators 28. By means of a bend 102 the tube 92 is deflected downward here and continued down by a fourth partial segment 104 and connected with the part 86 of the absorber channel 82, so that the absorber channel 82 and the tube 92 are combined in a loop. The inner width of the tube 92 is equal to the inner width of the absorber channel 82; the diameter of the first absorber balls is coordinated with the inner width of the tube, so that the absorber balls largely fill the inner width of the tube, while retaining their easy mobility within the tube.

In the second partial segment 98 a feeder location 108 is provided for the supply of gas to transport the first absorber balls in the third partial segment in the upward direction. Cooling gas is used as the gas; it is taken by means of a line 110 from the cold gas collector space 66, with a control valve 112 being placed in between. A ball brake and the second metering device are further provided in the first partial segment, as described in detail in connection with FIG. 10.

In the partial segment 104 in the vicinity of its connection with the partial segment 86 of the absorber channel a first metering feeder 116 is inserted for the first absorber balls 106 into the tube 92. This metering feeder 116 is shown in detail and enlarged in FIG. 2. According to this, the metering feeder has an upper blocking body 118 and a lower blocking body 120. The distance between these blocking bodies corresponds approximately to the diameter of the first absorber balls 106. Both blocking bodies may be inserted into the first partial segment 104 by means of a drive 122.

Figure 3:
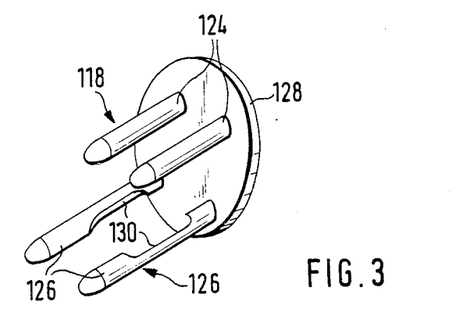
FIG. 3 is a perspective view of the detail III of FIG. 2, enlarged.

The upper blocking body 118 comprises two upper pins 124 arranged horizontally adjacent to each other, the front end whereof is pointed and distance whereof is adequate to interrupt the flow of balls. The lower blocking body 120 has two pointed lower pins 126 arranged adjacent to each other, the horizontal mutual distance whereof is just sufficient to interrupt the flow of balls, i.e. the distance of the pins 126 is slightly less than the diameter of the balls, the same is true for the upper pins. All of the pins are mounted on a disk shaped common carrier body 128 with a circular configuration. This may be seen very clearly in FIG. 3, which is a perpsective view of the carrier body, together with the pins.

Figure 2:
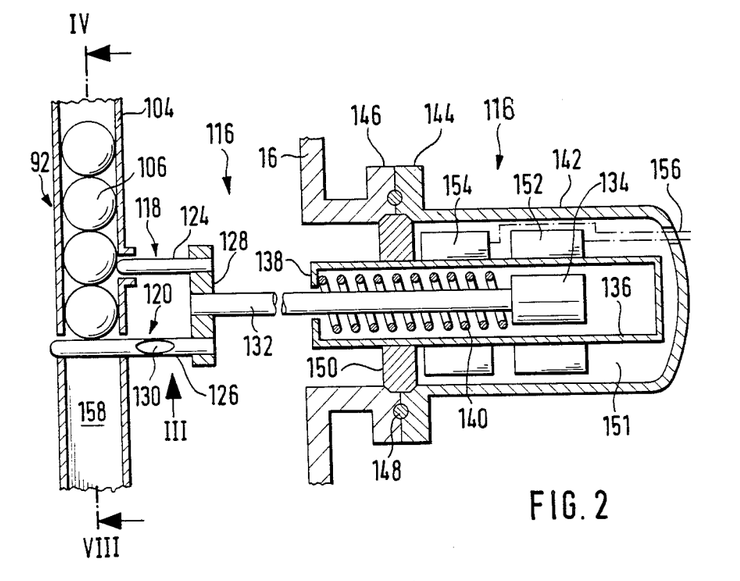
FIG. 2 shows the area II of the object of FIG. 1 as a detail, enlarged and in an axial vertical section.

The length of the upper pins 124 is approximately equal to the diameter of the fourth partial segment 104, while the length of the lower pins 126 is approximately twice that. The lower pins 126 have in the area located below the upper pins 124, recesses 130 facing each other and having a configuration such that a first absorber ball may drop through between the pins 126 in the area of the said recesses.

The carrier body 128 is connected by means of a rod 132 with a cylindrical holding magnet 134. This holding magnet 134 is guided within a cylindrical bushing 136, wherein between the holding magnet 134 and the left bottom 138 of the bushing a helical spring 140 surrounding the rod 132 is inserted, said spring pressuring the holding magnet 134 to the right. Preferably, two helical springs inserted into each other are provided.

The bushing 136 is arranged in a closed cylindrical housing 142 fastened by a flange 144 to a flange 146 of the pressure vessel 16 with the insertion of a seal 148. The inside of the flange 144, 146 has a peripheral recess whereby a circular disk 150 is mounted, which in turn supports a bushing 136. In the annular space 151, formed between the bushing 136 and the housing 142, a first magnet coil 152 is located and adjacently to it a second magnet coil 154. These magnet coils may be supplied by the electric conduits 156 indicated, selectively with electric current.

Figure 4:
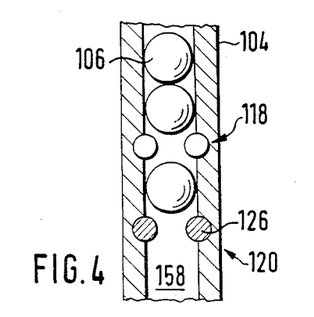
FIGS. 4 and 5, 6 and 7, 8 and 9 illustrate the individual working positions of the object of FIG. 2 in a simplified representation.
Figure 5:
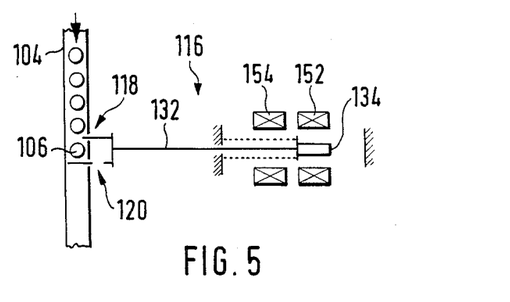
Figure 6:
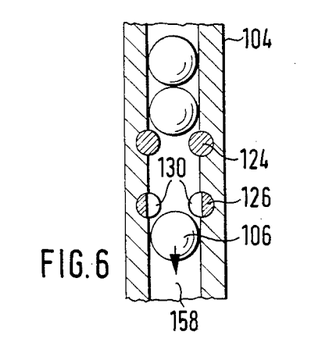
Figure 7:
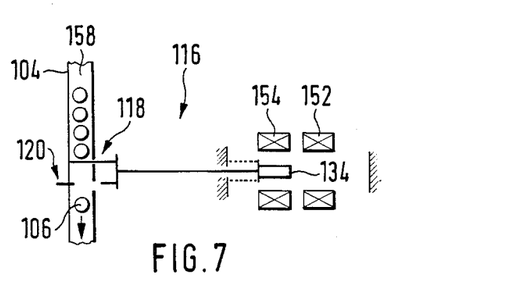
Figure 8:
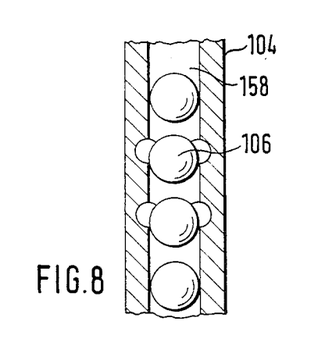
Figure 9:
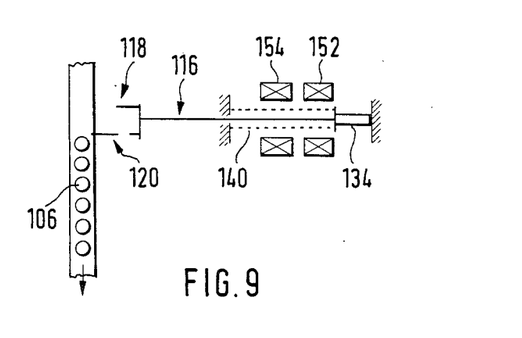

The mode of operation of the first metering feeder is illustrated in more detail in FIGS. 4 and 9, wherein the FIGS. 4, 6 and 8 each show a vertical longitudinal section through the object of FIG. 2, corresponding to the sectional line IV–VIII, while the FIGS. 5, 7 and 9 represent the metering feeder 116 at a reduced scale and highly simplified.

If according to FIG. 5 the first magnet coil 152 is actuated by the introduction of a current, the holding magnet 134 is drawn into this first magnet coil 152 and brought into a first position, corresponding to the first position of the blocking bodies 118, 120. In this first position the upper blocking body 118 is located outside the internal space 158 of the partial segment 104, while the front end of the lower blocking body 120 is located in the inner space and blocks the flow of balls, with one of the absorber balls 106 resting directly on the blocking body 120. It is seen from FIG. 5 that the front end of the lower blocking body 120 is then located in the inner space 158, while the sectional view according to FIG. 4 shows how the lowest absorber balls is resting on the pins 126 of the blocking body.

If the first magnet coil 152 is deactivated and the second magnet coil 154 actuated by a supply of current, the holding magnet 134 is drawn to the left into the second position (FIGS. 6 and 7). The blocking body is thereby displaced to the left in a second position against a stop, wherein the upper blocking body 118 is arranged in the inner space 158 of the partial segment 104 of the tube. In this position the recesses 130 of the lower pins 126 are located inside the tube so that the lowest of the absorber balls 106 is able to pass through the lower absorber body 120 and drop in the inner space 158. FIG. 6 shows how the pins 124, 126 of the blocking bodies block the flow of balls or release the lowest of the absorber balls 106. The flow of balls may therefore be metered by the positions 1 and 2 of the blocking bodies.

If there is no current in the magnet coil 152, 154, the holding magnets 134 are displaced by the helical springs 140 against a stop in a third position so far to the right that both blocking bodies 118, 120 are located outside the inner space 158 and the absorber balls 106 may pass without hindrance, as shown clearly in FIG. 9. The corresponding FIG. 8 shows that at this time there are no pins of the blocking bodies inside the tube. This third position is occupied among other occasions in case of a power failure and the absorber balls 106 must be moved into the absorber channels for reasons of safety. For added safety, two helical springs may be arranged within each other.

It is further seen in FIG. 4, 6 and 8 that the pins 124, 128 of the blocking bodies are guided in semicircular recesses of the partial segments 104.

Figure 10:
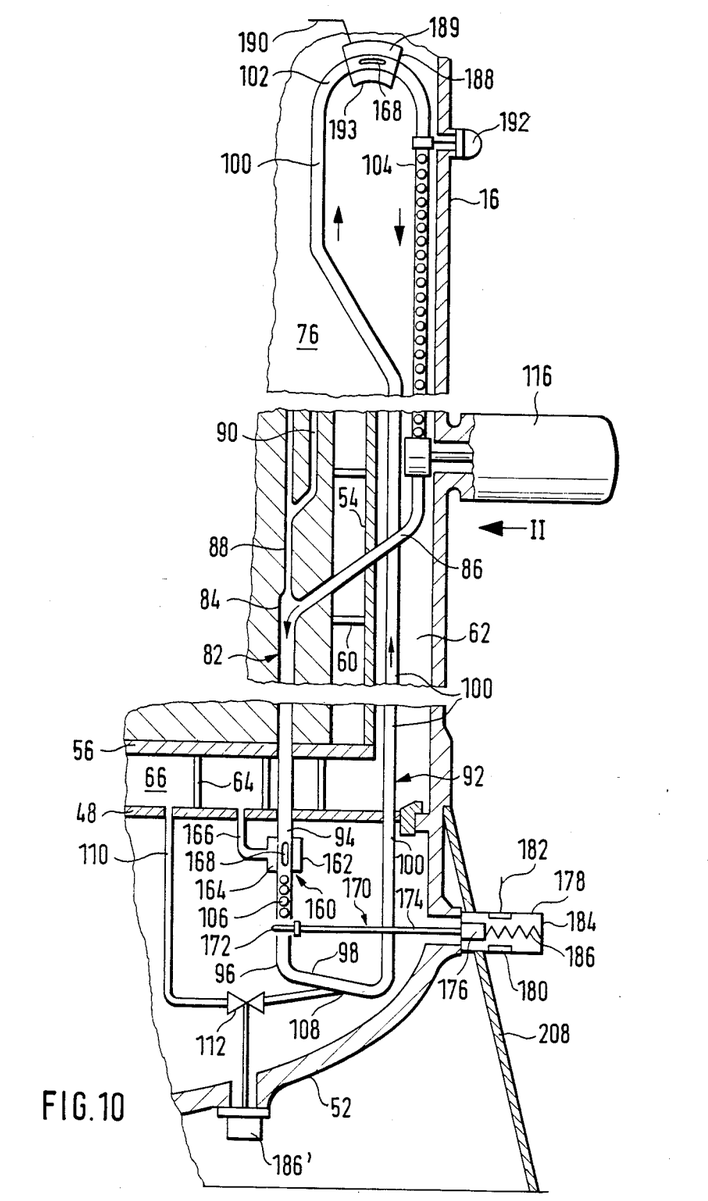
FIG. 10 shows the right hand area X of the object of FIG. 1 as a detail and enlarged, and FIG. 11 displays the subterranean layout of the pressure vessel in a substantially reduced and simplified view.

FIG. 10 shows the area X of FIG. 1 as a detail and enlarged, whereby the course of the tube 92 and of the absorber channels may be seen more clearly, while the area X is represented foreshortened by the elimination of nonessential parts. The vertical absorber channel 82 is seen, to which the first vertical partial segment 94 of the tube 92 is joined, which passes by means of a tube bend 96 into the second partial segment 98, connecting upward with the third partial segment 100 leading over the absorber channels.

In the first partial segment 94 a ball brake 160 is inserted. This comprises a housing 162, which partially surrounds the partial segment 94 while forming an intermediate space 164. The intermediate space 164 is connected through a line 166 with the cold gas collector space 66, with the optional insertion of a chock valve. In the tube wall of the partial segment 94 a plurality of slits 168 extending in the longitudinal direction of the tube is arranged, said slits opening into the intermediate space 164. The slits are provided for the passage of fuel gas.

Underneath the ball brake 160 a second metering feeder 170 is located in the partial segment 94. The latter comprises a second blocking body 172, which is connected by means of a rod 174 with a holding magnet 176. The holding magnet is located in a housing 178, tighly mounted on the outside of the pressure vessel 16. Within the housing 178 an annular magnet coil 180 is provided, into which the holding magnet 176 is drawn if power is supplied to the magnet coil through the line 182. Between the right end 184 of the closed housing 178 and the holding magnet 176 at least one helical spring 186 is inserted, which in case of a deactivated magnet coil 180 pressures the holding magnet to the left, thereby bringing the second blocking body 172 inside the partial tube segment 94, as shown in FIG. 10. The second blocking body 172 is identical in configuration with the upper blocking body 118 of FIG. 2, and similarly, the other parts of the second metering feeder 170 are analogous to the first metering feeder 116 according to FIG. 2, so that no further explanation is required for those skilled in the art.

In the second partial segment 98 of the tube the feeder location 108 for gas to transport the first absorber balls 106 upward is provided. The feeder location 108 is connected by means of a line 110 joined at an acute angle to the cold gas space 66, with the insertion of a control valve 112, the drive 186 whereof is tightly fastened to the basket arch bottom 52 and connected with the control valve 112.

As seen further in FIG. 10, the bend 102 connecting the third partial segment 100 with the fourth partial segment 104 of the tube 92 is equipped with a second ball brake 188 with the slits 168, the configuration whereof is identical with that of the ball brake 160. The intermediate space 189 of this second ball brake, formed between the tube bend 102 and the housing 193, is connected by means of a line 190 with a connector fitting 74 of the cooling gas blowers 30 (FIG. 1), with a control valve being inserted optionally in the line 190, the layout and location of which may be indentical with that of the control valve 112. Finally, a ball counter 192 is arranged in the partial segment 104 to measuringly determine the number of balls passing.

The second shutdown installation of the nuclear reactor plant comprises a cylindrical standing ball container 194, arranged in the area of the steam generators 28 above the small reactor in the space 76 (FIG. 1). In this ball container the second absorber balls 196 are stored, the diameter whereof is significantly less than the diameter of the first absorber balls. Tubular lines 200 are connected with the lower, conically tapering end of the ball container 194 with the insertion of a third metering feeder 198, said tubular lines leading to the second channel pieces 90. These second channel pieces 90 lead in the roof reflector approximately vertically to the channel piece 88 opening at the branching location 84 into the absorber channel 82. The second absorber balls 196 may thus be inserted in the same absorber channels as the first absorber balls (see also FIG. 10).

In operation, the cooling gas blowers 30 are actuated and the cooling gas, for example helium, flows with an operating pressure of approx. 70 bar through the pile 40 of the fuel elements upwards, whereby it is heated to approx. 700° C. After passage through the roof reflector 42 with the aid of the bores 70, it arrives in the hot gas collector space 72, from where it flows into the lower end of the steam generator 28. In the steam generators the cooling gas flows upward, is cooled to approx. 250° C. and suctioned through the connector fittings 74 into the cooling air blowers 30. The cooling gas leaves the cooling gas blowers 30 at their lower end and enters the inner space 76 of the upper part 20 of the pressure vessel, flows downward and enters the annular gap 62 formed between the lateral part 54 of the heat shield and the lower part 18 of the pressure vessel. At the lower end of the annular gap 62 the cooling gas is deflected into the cold gas collector space 66, from where it reenters the circulation through the bores 68 of the bottom reflector and the pile 40. The feed water is conducted by the lines 78 to the steam generators, the steam is taken through the lines 80 and passed for utilization for example to a steam turbine installation.

During operation, the second absorber balls 196 are located in the ball container 194, the first absorber balls are stored outside the absorber channels 82 in the fourth partial segments 104 of the tube 92, with the first metering feeder 116 blocking in the first position according to FIGS. 4 and 5. If now absorber balls are to be inserted into the absorber channels 82, the first absorber balls are metered from the partial segment 104 and inserted successively into the absorber channel 82, for which the first metering feeder 116 is brought alternatingly into the first and second position by the appropriate excitation of the magnet coils, so that the absorber balls drop by the force of gravity into the absorber channels. This process has already been described hereinabove in connection with FIGS. 2 to 9. During the penetration of the first absorber balls 106 into the absorber channel 82 the second metering feeder 170 is blocking the first partial segment 94 so that the first absorber balls remain in the absorber channel 82. If now the first absorber balls are to be removed from the absorber channel, the first partial segment 94 is released by the opening of the second metering feeder 170, so that the balls enter the second partial segment 98. Simultaneously, the control valve 112 is opened, so that from the cold gas space 66, cooling gas may enter the second partial segment 98 through the line 110 at an acute angle. The cooling gas, flowing under pressure, now transports the first absorber balls 106 through the third partial segment 100 upwards, so that the first absorber balls pass into the fourth partial segment 104 through the tube bend 102. In order to store the first absorber balls in this partial segment, the first metering feeder 116 must obviously be in its blocking position. The same is true for the second metering feeder 170, as by blocking the first partial segment 94 the reentry of the first absorber balls 106 in the absorber channel 82 is prevented. Under certain conditions the second metering feeder may be eliminated, because the deflection of the absorber balls by means of the tube bend 96, optionally through a further tube bend, largely prevents the backflow of the absorber balls through the first partial segment 94 into the absorber channel 82.

In order to brake the fall of the first absorber balls 106 in the absorber channel 82, cooling gas is introduced through the line 166 into the ball brake 160, from where it flows through the slit 168 into the internal space of the partial segment 94 and from there through the absorber channel 82 upwards against the direction of the drop of the first absorber balls, finally to escape through the channel piece 88 into the hot gas collector space 82. The channel piece 88 may have a smaller cross section than the absorber channel 82 or it may be equipped with a choke location, in order to influence the mass flow of the gas flowing in the upward direction, thereby controlling its braking action (FIGS. 1 and 10).

To be able to brake the first absorber balls 106 being transported in the upward direction, during their passage into the dropping fourth partial segment 104, a second ball brake 188 is provided in the area of the bend 102, having a configuration identical with that of the brake 160. The internal space of the ball brake is connected by means of a tubular line 190 with the suction fitting 74 of a blower 30. The conveying gas of the partial segment 100 leading in the upward direction is thereby suctioned off, so that the balls pass into the partial segment 104 with a low kinetic force and may be stored therein. In order to determine the number of first absorber balls transported, a suitable ball counter 192 is provided in the fourth partial segment 104, connected with a joining part 195 leading to the outside.

In case of an incident or a scram, the holding magnets 152 and 154 of the first metering feeder are deactivated so that the blocking body is brought by spring force from the fourth partial segment 104, with the consequence that the first absorber balls 106 may enter the absorber channels 82 without hindrance or metering (FIGS. 8, 9 and 10).

The second shutdown installation is operated in an emergency only. For this purpose, the third metering feeder 198 releases the tubular lines 200, so that the second absorber balls 196 may enter the absorber channels 82 by the force of gravity through the second channel pieces 90 and the channel pieces 88. This is possible, because the connection from the ball container to the absorber channels is dropping. (FIG. 1).

If the pressure of the cooling gas or the difference in pressure between the cold gas space 66 and the suction fitting 74 is not sufficient for the transport of the second absorber balls, a supplemental blower may be inserted in the line 110 to increase the pressure.

Figure 11:
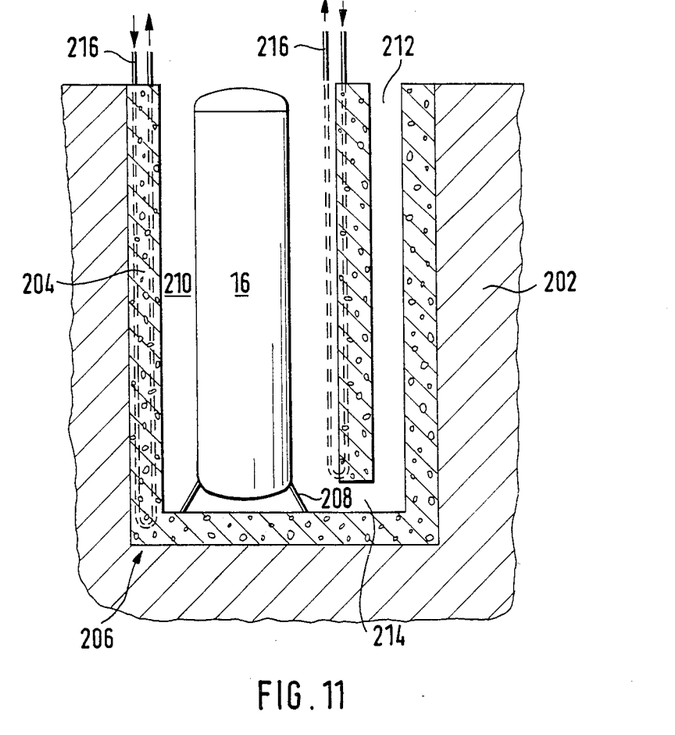

FIG. 11 shows a highly simplified and reduced view of the subterranean layout of the pressure vessel 16. For this purpose, a cavity 206 is excavated in the ground and provided with a concrete lining. The pressure vessel 16 is erected with the aid of its feet 208, with a free annular gap 210 being provided between the pressure vessel and the lining. A vertical shaft 212 is excavated adjacently to the cavity 206, again lined with concrete and leading to the floor of the annular gap 210 and connected with it by a walking channel 214. The shaft 212 and the channel 214 is used, among others, to maintain the installation.

In the lining 204 and/or on the lining 204, cooling pipes are arranged, through which a cooling medium, for example water, may be conducted. Thereby the heat radiated by the pressure vessel onto the lining 204 may be removed. This thermal radiation is significant, as the pressure vessel 16 is not equipped with heat insulation. The pressure vessel may additionally be cooled with air which is being suctioned through the shaft 212 as the result of the thermal rise in the annular space 210. The aforedescribed types of external cooling are of importance if the removal of heat or the decay heat by the heat exchangers 28 is failing.

The first and second absorber balls are identical among themselves. The first absorber balls, depending on the dimensions of the absorber channels, have a diameter of 50 to 150 mm, while the second absorber balls have a diameter less than 15 mm, preferably less than 10 mm. The minimum diameter is 3 mm. The cross sections of the tubular lines and structural parts wherein the second absorber balls are conducted, are determined only in view of an adequate transportation of the said balls. The coordination of the diameter of the first absorber balls with the transport tube 92 is to assure the transport of the absorber balls by the gas introduced.

The capacity of a small high temperature reactor is such that the steam produced may generate electrical power of 30 to 130 MW, in particular 50 to 130 MW, by means of steam turbines and electric generators.

As seen from the description above of the example of embodiment, the configuration according to the invention renders possible the installation and dismantling of all individual parts from above and limits the lateral and bottom space required to a minimum, while maintaining a full operational capability.

What is claimed is:

1. A nuclear reactor power plant comprising:
   a high temperature reactor with at least one dishcarge means for the removal of fuel elements;
   a plurality of heat exchangers;
   a multiple part, standing cylindrical pressure vessel wherein said heat exchangers are positioned above said reactor and housed together with said reactor within said pressure vessel;
   cooling gas blower means located above said heat exchangers and entirely within said pressure vessel for aiding the flow of cooling gas heated by the reactor from the bottom through the top of said heat exchangers;
   a plurality of absorber channels extending vertically through a side reflector of said reactor wherein each absorber channel comprises an upper terminal area, a lower terminal area and an absorber tube joining said upper and lower areas;
   a first means for operational control and shutdown located entirely within said pressure vessel including means for insertion of first absorber elements at said upper terminal area and removal of said elements at said lower terminal area and an absorber loop for circulating said first absorber elements from said lower terminal area to said upper terminal area;
   a second means for shutdown located entirely within said pressure vessel including second absorber elements, at least one absorber element container means for storing said second elements located above said absorber channels and means for connecting said container means to said plurality of absorber channels at said upper terminal area in parallel with said means for insertion of first absorber elements;
   said second shutdown means is further for controlling insertion of said second absorber elements into said absorber channels.

2. The nuclear reactor power plant as in claim 1, wherein said first absorber elements comprise first absorber balls the diameter of the first absorber balls and the internal width of said absorber tubes being correlated with each other so that the first absorber balls are largely filling the internal width of the tube while retaining their easy mobility.

3. A nuclear reactor power plant as in claim 2, characterized in that each loop comprises beginning at the lower terminal area a first downwardly directed partial segment, connected by means of a tube bend with a second partial segment extending with a downward slope in the radially outward direction in the area of an annular gap between the reactor and the pressure vessel, a third partial segment is connected with the second partial segment, said third segment leading in the annular gap to above the small reactor and passing into a fourth partial segment returning with a downward slope to the upper terminal area of said absorber channel.

4. A nuclear reactor power plant as in claim 3, further comprising in the second partial segment, means for supplying gas connected to a cold gas collector space for pneumatic transport of the first absorber balls upwards into the fourth partial segment, in the transition area from the third to the fourth partial segment and the first partial segment a pneumatic ball brake and in the fourth partial segment a first metering feeder for feeding the first absorber balls in the upper terminal area of the absorber channels.

5. A nuclear reactor power plant as in claim 4, wherein the first metering feeder comprises a first and second blocking body arranged above each other at a distance approximately equal to the diameter of the first absorber balls, said blocking bodies being insertable by means of at least one drive transversely to the tubular segment into the internal space of said segment, wherein to interrupt the flow of the balls at least one blocking body is introduced if the flow of balls is to be released, to meter the flow of balls the lower blocking body initially blocks the partial segment, while the upper blocking body simultaneously releases the flow and subsequently the upper blocking body blocks and the lower blocking body releases the first absorber ball resting upon it;

wherein the upper blocking body comprises two upper pins arranged horizontally adjacent to each other, the mutual distance whereof is sufficient for the interruption of the flow of balls, that the lower blocking body comprises two lower pins adjacent to each other and spaced apart just enough to interrupt the flow of balls, the lower pins in the area located under the upper pins are provided with recesses facing each other such that a first absorber ball may pass through the lower pins into the tube segment, both the upper and the lower pins are connected to the drive, whereby the two blocking bodies exhibit three different positions; in a first position the upper pins are located outside the segment and the lower pins with their full cross section in the internal space of the partial segment, in a second position the upper pins are located within the tube segment and the lower pins are located with their recesses in the internal space and, in a third position the upper and lower pins are outside the internal space.

6. A nuclear reactor power plant as in claim 5, wherein the drive comprises a holding magnet that may be brought by means of magnet coils arranged adjacent to each other, into a first and a second position corresponding to the first and second position of the blocking bodies and which by the force of at least one helical spring may be moved into a third position, corresponding to the third position of the blocking bodies.

7. A nuclear reactor power plant as in claim 6, wherein a second feeder for the first absorber balls follows the ball brake and comprises a blocking body capable of being moved by a second drive into and from the inner space of the tube.

8. A nuclear reactor power plant as in claim 7, wherein said second feeder has a closing body having a configuration corresponding to that of the first blocking body and further comprising: a magnetic armature connected to the closing body; a magnetic coil for actuating said armature to release said absorber balls; and spring means for forced insertion of said closing body upon current failure in said magnetic coil.

9. A nuclear reactor power plant as in claim 8, wherein the ball brakes comprise slits in the tube walls, through which gas is introduced and metered for the braking of the flow of balls.

10. A nuclear reactor power plant as in claim 9, wherein the second absorber elements comprise absorber balls, said second absorber balls having a substantially smaller diameter than the first absorber balls.

11. A nuclear reactor power plant as in claim 10, further comprising a third metering feeder connected to the container for controlled release of said second absorber elements, having a configuration similar to the first metering feeder.

12. A nuclear reactor power plant as in claim 1 or 11, futher comprising a subterranean placement of the pressure vessel, wherein the pressure vessel is located in a vertical cavity circular in its cross section, of the ground, the walls thereof being provided with a concrete lining, while forming an annular space.

13. A nuclear reactor power plant as in claim 12, wherein the lining further comprises cooling pipes arranged on the surface and/or embedded in the lining, the cooling pipes being filled with a cooling medium.

14. A nuclear reactor power plant as in claim 13, wherein said cavity further comprises at least one vertical shaft of the same depth said shaft is connected at its lower end with the annular space by means of a least one walking channel.

15. A nuclear reactor power plant as in claim 2 wherein said second absorber elements exhibit a substantially smaller diameter than said first absorber elements.

16. A control and shutdown apparatus for a high temperature gas cooled nuclear reactor power plant comprising:

a plurality of absorber channels extending vertically through a side reflector of a reactor wherein each absorber channel exhibits an upper terminal area, a lower terminal area and an absorber tube joining said upper and lower areas;

first means for operational control an shutdown connected to said absorber channels including means for insertion of first absorber balls at said upper terminal area and removal of said balls at said lower terminal area and an absorber loop for circulating said first absorber balls from said lower terminal area to said upper terminal area;

a second means for shutdown connected to said absorber channels including second absorber balls, at least one absorber element container means for storing said second balls located above said absorber channels and means for connecting said container means to said plurality of absorber channels at said upper terminal area in parallel with said means for insertion of first absorber balls;

said second shutdown means is further for controlling insertion of said second absorber balls into said absorber channels;

wherein said first absorber balls exhibit a spherical diameter which is correlated with the internal width of said absorber channels so that said first absorber balls largely fill the internal width of said channels while maintaining easy mobility within said channels; and said second absorber balls exhibit a substantially smaller spherical diameter than said first absorber balls;

wherein each loop comprises beginning at the lower terminal area a first downwardly directed partial segment, connected by a tube bend to a second partial segment, extending with a downward slope in a radially outward direction, a third partial segment is connected to the second parallel segment, said third segment leading to above the reactor and passing into a fourth partial segment returning with a downward slope to the upper terminal area of said absorber channel;

means for supplying gas in the second partial segment connected to a cold gas collector space for pneumatic transport of the first absorber balls upwards into the fourth partial segment, a pneumatic ball brake in the transition area from the third to the fourth partial segment and in the first partial segment, and a first metering feeder for feeding the first absorber balls in the upper terminal area of the absorber channels in the fourth partial segment;

wherein said first metering feeder comprises a first and second blocking body arranged above each other at a distance approximately equal to the diameter of the first absorber balls, said blocking bodies being insertable by means of at least one drive transversely to the tubular segment into the internal space of said segment, wherein to interrupt the flow of the balls at least one blocking body is introduced if the flow of balls is to be released, to meter the flow of balls the lower blocking body initially blocks the partial segment, while the upper blocking body simultaneously releases the flow and subsequently the upper blocking body blocks and the lower blocking body releases the first absorber ball resting upon it;

wherein the upper blocking body comprises two upper pins arranged horizontally adjacent to each other, the mutual distance whereof is sufficient for the interruption of the flow of balls, that the lower blocking body comprises two lower pins adjacent to each other and spaced apart just enough to interrupt the flow of balls, the lower pins in the area located under the upper pins are provided with recesses facing each other such that a first absorber ball may pass through the lower pins into the tube segment, both the upper and the lower pins are connected to the drive, whereby the two blocking bodies exhibit three different positions; in a first position the upper pins are located outside the segment and the lower pins with their full cross section in the internal space of the partial segment, in a second position the upper pins are located within the tube segment and the lower pins are located with their recesses in the internal space and, in a third position the upper and lower pins are outside the internal space.

17. A control and shutdown apparatus according to claim 16 wherein said first absorber ball spherical diameter is 50-150 mm and said second absorber ball spherical diameter is greater than 3 mm.

18. A control and shutdown apparatus according to claim 16, wherein the drive comprises a holding magnet that may be brought by means of magnet coils arranged adjacent to each other, into a first and a second position corresponding to the first and second position of the blocking bodies and which by the force of at least one helical spring may be moved into a third position, corresponding to the third position of the blocking bodies.

19. A control and shutdown apparatus according to claim 18, further comprising a second feeder for the first absorber balls following the ball brake in said first partial segment and comprises a blocking body capable of being moved by a second drive into and from the inner space of the tube.

20. A control and shutdown apparatus according to claim 19, wherein said second feeder has a closing body having a configuration corresponding to that of the first blocking body and further comprising:
    a magnetic armature connected to the closing body;
    a magnetic coil for actuating said armature to release said absorber balls; and
    spring means for forced insertion of said closing body upon current failure in said magnetic coil.

21. A control and shutdown apparatus according to claim 16, wherein the ball brakes comprise slits in the tube walls, through which gas is introduced and metered for the braking of the flow of balls.

22. A control and shutdown apparatus according to claim 16, further comprising a metering feeder connected to said container means, for controlled release of said second absorber elements.

23. A control and shutdown apparatus according to claim 22, wherein said means for inserting comprises sloping lines connecting said ball container and said absorber tube upper terminal area.

* * * * *